Aug. 13, 1968     D. R. GRANT     3,397,006

CAMPER TRUCK EXTENSION STRUCTURE

Filed April 28, 1966

DONALD D. R. GRANT
INVENTOR.

Alton V. Oberholtzer
BY

United States Patent Office 3,397,006
Patented Aug. 13, 1968

3,397,006
CAMPER TRUCK EXTENSION STRUCTURE
Donald R. Grant, 3400 Highway 61,
St. Paul, Minn. 55110
Filed Apr. 28, 1966, Ser. No. 546,014
4 Claims. (Cl. 296—26)

ABSTRACT OF THE DISCLOSURE

The present disclosure embodies a camper truck extension which is portable therewith as a part thereof, or attachment to the truck body which extends the available camping area of the truck body for living or storage quarters.

---

This invention relates to a portable and collapsible camper truck extension structure in combination with the camper truck body or method of improving upon the available body space of a camper truck by adding an enclosure thereto available for providing additional protective area for storage, sleeping, housing and the like, including the advantage of providing a readily moveable fish house.

The building of independently constructed and self sustaining tent structure which may be independently erected is well known to the art. In addition, the art is aware of the addition of canopies over doorways and protective coverings as they are mounted or constructed to shade, protect or overhang an area to be protected. However, a camper is oftentime faced with the problem of changing from wet to dry clothes in the confined narrow space of the camper body proper, or the need for additional sleeping space, without the inconvenience of having to carry and erect such tent structure as has been known to the art. Accordingly it will be recognized that the problem has been in providing some auxiliary convenient way to provide a relatively permanent structure which adds to the camper space and yet remains as a permanent fixture without encumbering the mobility of the camper structure proper.

It will therefore be recognized that it is an object of this disclosure to provide a solution to the above problems with a structure that is relatively permanently mounted on a camper truck without occupying the normally crowded space therein and when unfolded adds an additional protective camper enclosure area which is useful in many ways and adds or increases the value of the camper truck in a manner not heretofore indicated or shown to be possible therewith.

Figure 1:
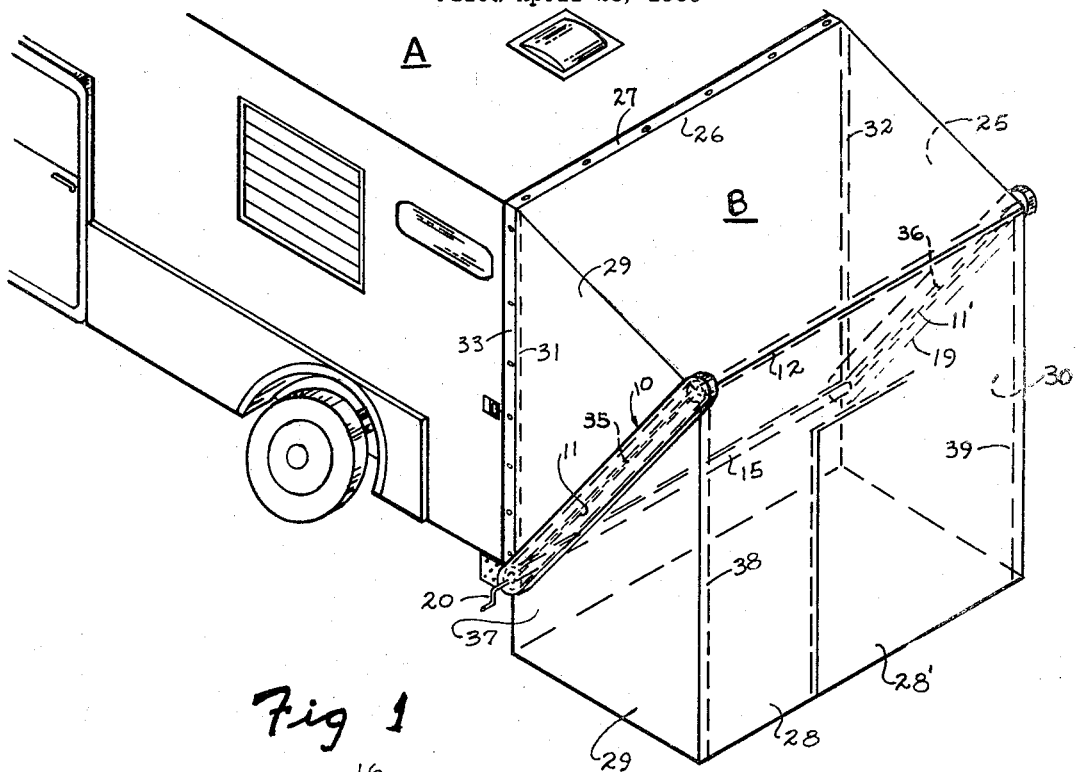
Figure 2:
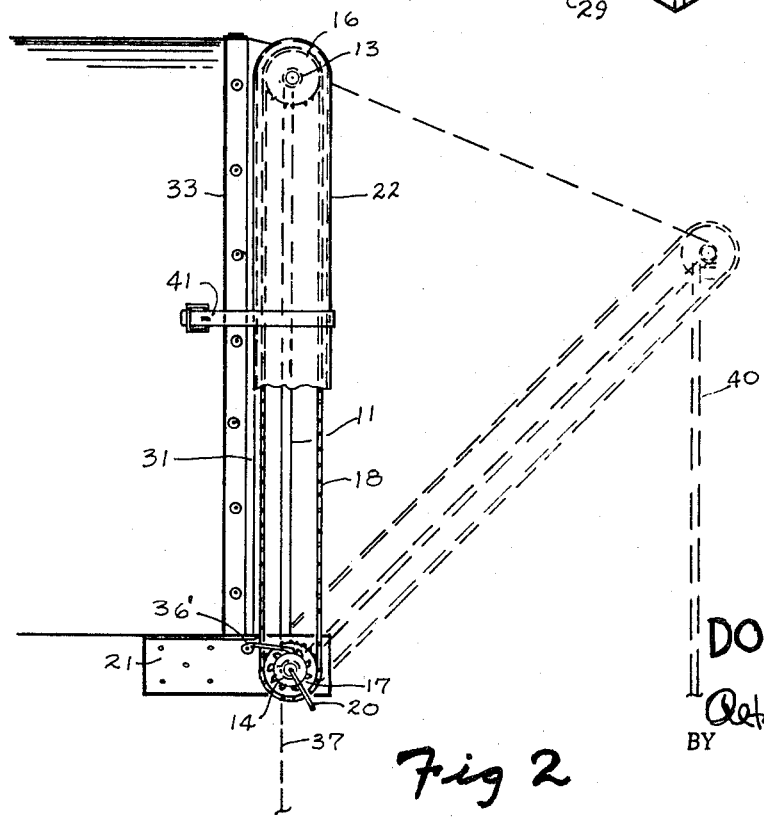

Further objects and advantages will become more apparent from the following description taken in conjunction with the drawings wherein:

FIG. 1 is a perspective in partial top and side view of a camper truck body having the added space enclosure attached thereto and mounted thereon, FIG. 2 is a side plan view in partial broken section illustrating the manner of attachment and operation of the camper truck body additional enclosure, as herein embodied and disclosed.

With reference to the structure provided there is shown a camper truck with its conventional back door (not shown) and having a portable extension carried therewith. Attached to the back of the camper truck A is a fixed collapsible shelter portion B suspended outwardly and downwardly in relationship thereto and to the ground immediately therebelow, said shelter having an opening herethrough closed at one side by the rear of the camper and the other by a suitable closure means for entree thereinto and egress therefrom. To an active mechanical imagination once given the idea and the view of the general structural combination embodied it is easy for them to imagine various modifications that might have been possible with the representation presented. However, there would still be relatively involved many necessary mechanical changes necessitating a completely new arrangement of relative parts in the new combination, such as herein provided and embodied in the drawings, specifications and claims.

Essentially the shelter portion B comprises a pivotal frame 10 mounted on and supported by the rear of the camper truck body portion A. Such frame consists of a pair of pivotal arms or rods 11 and 11' supporting at their outermost ends a shaft or roller 12 therebetween and upon which the canvas shelter top, sides and front portions are adapted to be rolled up when the rods 11 and 11' are folded or pivoted back, by crank means as hereinafter described, and at their pivotal lower or innermost ends are supported upon, or by suitable bearings, as at 14, mounted at the ends of shaft or roller 15. Alternatively the rods 11 and 11' may merely be hinged and pivoted back against the camper truck body. However, such hinging has certain inconveniences which are not desirable in closure of the back of the camper truck door and dragging of the covering material.

From the illustrative example of the drawings it will be recognized that the framework 10 includes pairs of driven and driver cogged wheels, as at 16 and 17 respectively, mounted on each of shafts 12 and 15 and over which relative and suitable driving means, as chain drives 18 and 19 are mounted. In order to rotate the respective driving means 18 and 19 the shaft 15 is rotated by crank 20 preferably adapted to be removeably fitted within a conventional type socket in shaft 15 or drive wheel 17 (not shown in detail), as known to the art. Inasmuch as each of the cogged wheels are fixed to the relative ends of shafts 12 and 15, the drive means, 18 and 19 rotate shafts 12 and 15 to accomplish their separate duties as herein provided.

As will be recognized in this new arrangement the frame 10 is adapted to be pivotally mounted on the rear of a camper trailer and this is accomplished by a pair of suitable bracket means 21 (one only being figuratively illustrated) mounting the shaft 15 adjacent the rear base of the camper body. The details of the apertures in each of the mounting brackets, through which the respective ends of shaft 15 extend and the relatively integral right angular plate members thereon, supporting the ends of shaft 15, rods 11 and 11' and fastening the brackets to the camper body are not fully shown or disclosed herein, as such are in themselves, a matter of mechanical design and can be fashioned from suitable metal, or equivalent material, to fit a body style, as required. The chains, 18 and 19 and associated cogged wheels turning therewith are preferably encased in a protective shield means of suitable metal or plastic material which serves as the protective covering 22. The coverings are supported by the ends of shafts 12 and 15 to overlie the driving means 18 and 19 and their relative driving and driven wheel members.

In assembling the pivotal frame 10 onto the truck body, there is provided a flexible covering as suitable, tent canvas, plastic or the like sheet material which serves to form the additional camper enclosure. This additional camper enclosure is formed by flat top portion 25 having its edge portion 26 fastened by a suitable striping means 27 to the uppermost edge of the camper body and a contiguous strip 27 which extends relatively continuously downwardly therefrom or as an integral tent portion over roller 12, to engage the ground area immediately therebelow. At the point where top portion 25 and strip 28 passes over the roller 12 it is fastened thereto as by pinching in a V-groove, stapling a stripping thereover, or other suitable fastening means (not shown).

Thereby, as the crank 20 is turned to pivot shaft 15 and turn rods 11 and 11' to a vertical position, the chains 18 and 19 are rotated to turn shaft 12, as is apparent from the description herein, winding up top 25 and strip 28 into roll form and carrying position. In the event the strip portion 28 is of greater length than top 25, its end may be folded or doubled up in order to wrap the strip 28 completely into the roll form.

The sides of the tent covering 29 and 30 are provided as extended integral strip portions of top 25 which are removably fastened to the camper body by suitable fastening means, as eyelet fasteners or zipper strips as at 31 and 32. In the preferred arrangement however the inner edges of strips 29 and 30 are secured as by the stripping 33 fastening the tent sides (illustratively shown on one side only) to the camper body as shown more clearly at the left hand side, with suitable zipper strips 31 and 32 extending from the top 25 down to the corner adjacent the base of the camper body. Further, zipper strips 38 and 39 are preferably provided to release the outside corners on the back 28 from sides 29 and 30 and also serve to tighten and stabilize the covering 13. Thus, when the zipper strips 31 and 32 are unzipped, the zipper strips 38 and 39 are unzipped, the side strip portion are folded up and over the top 25. Thereby the side portions 29 and 30 are rolled up with top 25 and strip 28 on shaft or roller 12.

If desired the side strip portions 29 and 30 may be provided with additional zipper fastening strips (not shown), as behind corners 22, but extending from the top 25 at its juncture with strip 28, or from the corners adjacent the ends of shaft or roller 12 to the edge of the base of camper body A. Thus the lower portions of sides 29 and 30 may be provided as separable from the integral and relatively triangular upper portions of side strip 29 and 30. By providing such zipper strips, behind corners 22, the zippers 38 and 39 may be eliminated or left fastened and the lower portion of sides 29 and 30 turned back and rolled up with portion 28. These strips 29 and 30 may be provided with flexible screened windows, as known to be used in tent manufacture. An additional provision of a further flexible shielding strip 37 is attached to shaft or roller 15 and adapted to be rolled up thereon as the rods 11 and 11' are pivoted into an upright position behind or adjacent the rear corners of the camper truck. If desired, an independent roller (not shown) for strip 37 may be used adjacent shaft or roller 15. While the rods 11 and 11' are normally adapted to be supported within the angular limits shown, there is provided a locking pin or latch 36 cooperative with the lugs on wheel 17. To further insure a proper support for the outermost ends of rods 11 and 11' there is preferably provided a pair of suitable supports as illustrated by 40, adapted to cup or rest under the ends of shaft or roller 12, one only being shown in dotted line in FIG. 2, and serving to reinforce the respective outermost corners of the enclosure. Zipper 38 or 39 may be used for entree and egress, although it is preferred to have a suitable tent doorway as at zippered doorway 28'. This adds to the camper enclosure which is open at the bottom and provided a readily portable fish house, sleeping area, or storage space provided as a portable extension to the camper truck. While the structure is designed to be self contained, when in folded position, it is desirable to provide a holding strap 4 with suitable fastening means for securing the folded structure to the camper body.

In accordance with the patent statutes, I have described the principles and operation of my embodiment and while I have endeavored to set forth the preferred and best arrangement thereof, I desire to have it understood that reasonable changes may be made within the scope of the following claims without departing from the spirit and scope of my improvement as expressed herein.

What I claim is:

1. An extension protective area for a camper comprising in combination:
   (A) A camper truck having a foldable tent covering enclosure attached to the rear of the camper truck body portion and supporting means therefor mounted on said truck body,
   (B) said supporting means comprising a pair of supporting rods having a roller mounted across the upper ends thereof and the lowermost ends pivotally mounted at the lower corners of the truck camper body,
   (C) pairs of sprocket gears at the ends of said roller and the pivotally mounted lower ends of said rods, rod means connecting the said pair of sprocket gears at the outermost ends of said rods, crank means for turning said latter pair of gears and driving means connecting said pairs of gears whereby when said crank means turns said lowermost gears to pivot said rods towards the back of said camper truck body the roller gears turn said roller,
   (D) flexible covering means attached to said roller and extending from the roof of said camper body over said roller in a depending relationship therefrom to engage a ground area immediately therebelow, said covering means having flexible side walls connected to said flexible covering and depending in a partially detachable manner therefrom to engage a ground area immediately therebelow and,
   (E) closure means for entree and egress to the area within said flexible covering means.

2. The structure of claim 1 wherein said flexible side wall are in separable sections comprising upper sections and lower sections, said upper sections consisting of a portion integral wtih said flexible cover and adapted to be rolled up therewith on said roller and said lower sections consisting of flexible members adapted to be fastened at the top to said upper sections.

3. The structure of claim 1 including additional flexible shielding means adapted to depend from the base of said truck body to the ground area therebelow and close the spacing between the base of said camper body and said ground area.

4. The structure of claim 1 including a pair of auxiliary supports for said roller means at the outermost ends of said rod means and adapted to extend therefrom to the ground area and support said roller.

References Cited

UNITED STATES PATENTS 1,178,734    4/1916    Krause.
2,107,608    2/1938    Hewlett.
2,122,681    7/1938    Dykes.

PHILIP GOODMAN, *Primary Examiner.*